Jan. 4, 1944. W. S. LACHMAN 2,338,444
METALLIC STRUCTURE
Filed Feb. 20, 1942  2 Sheets-Sheet 1
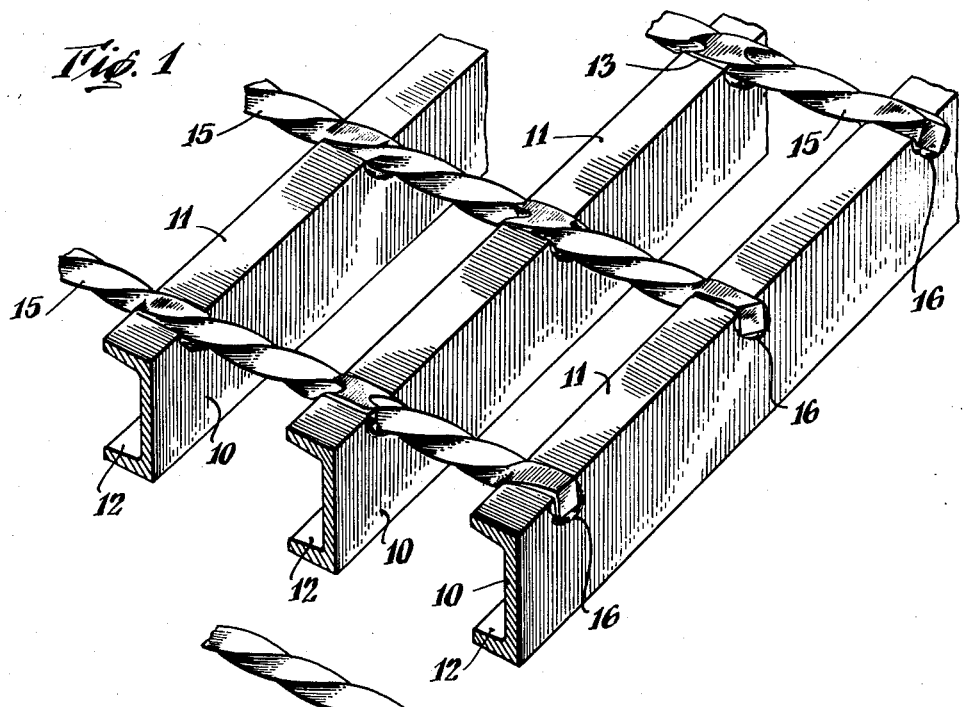
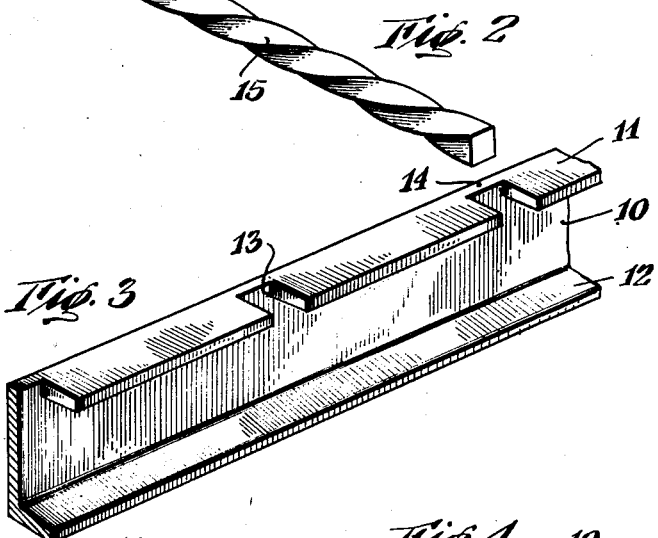
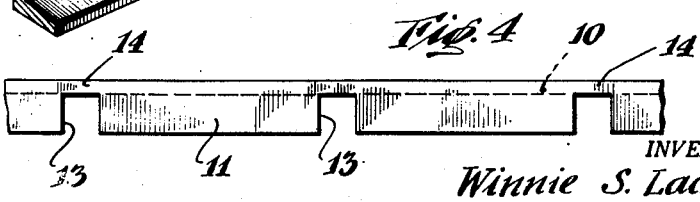
INVENTOR.
Winnie S. Lachman
BY Townsend + Decker
ATTORNEYS Jan. 4, 1944.  W. S. LACHMAN  2,338,444
METALLIC STRUCTURE
Filed Feb. 20, 1942  2 Sheets-Sheet 2

INVENTOR.
Winnie S. Lachman
BY Townsend & Decker
ATTORNEYS

Patented Jan. 4, 1944

2,338,444

UNITED STATES PATENT OFFICE 2,338,444

METALLIC STRUCTURE

Winnie S. Lachman, New York, N. Y., assignor to Structural Patents Corporation, New York, N. Y., a corporation of New Jersey Application February 20, 1942, Serial No. 431,615

9 Claims. (Cl. 189—82)

This invention relates to metallic structures adapted to sustain heavy loads and to resist forces applied under compression and it is particularly adapted in its application to bridge deckings, gratings for side-walks and other places, running boards for freight cars and other analogous uses.

The principal object of the invention is the production of a metallic structure of the character above referred to which shall have great strength and which shall be resistant to strains, stresses and buckling.

A further object of the invention is the production of a metallic structure of the above character the members of which shall be of standard size and construction which are easily procurable thus enabling the structure to be manufactured with ease, facility and expedition.

A further object of the invention is the production of a metallic structure having the characteristics above referred to and in which the bearing members shall comprise ordinary rolled channels of the size required whereby the strength of the structure not only is enhanced because of the constructional features of said channels but a structure is produced in which a relatively small number of said bearing members is necessary because of the inherent strength of said channels.

The invention also includes the manner or method of connecting the crossing or transverse members of the structure of the aforesaid channels, preferably by the well-known electric resistance welding process, but in such manner as to require a minimum amount of welding current with a minimum amount of extruded metal resulting from the welding operation while producing a welded joint between the intersecting members which shall be rigid and of maximum strength while possessing a pleasing appearance.

In addition to the objects and advantages above recited, the invention contemplates the production of a metallic grating which, preferably, shall be resistant to skidding or slipping. This is accomplished in the preferred form of the invention by the employment of rectangularly-shaped twisted bars for the crossing or transverse members the edges of corners of which produce the non-slip or non-skid effect.

Other and further objects of the invention will become apparent from the sub-joined description, the invention consisting in the metallic structure and joint hereinafter more especially described and then defined in the appended claims.

In the accompanying drawings showing a practical embodiment of the invention:

Figure 1 is a fragmentary perspective view of a metallic structure, such as a side-walk grating, embodying the invention.

Figure 2 is a perspective view of one of the rectangularly-shaped twisted bars shown in Figure 1 and forming the transverse or crossing members of the structure.

Figure 3 is an enlarged perspective view of one of the rolled channels forming the bearing members of the structure and which has been especially prepared or slotted for welding the crossing members thereto.

Figure 4 is a plan view of the bearing member of Figure 3.

Figure 5:
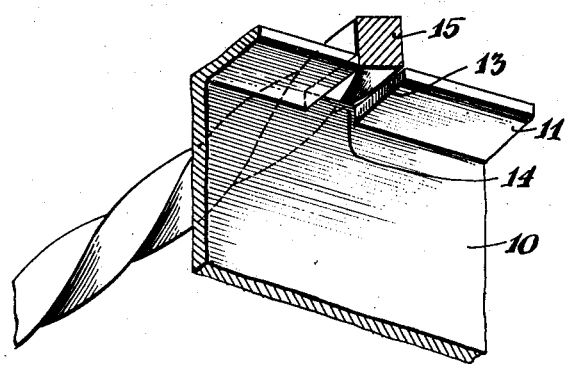
Figure 5 is an enlarged fragmentary perspective view of one of the bearing members and the one of the transverse members in proper position just prior to the welding operation.

Referring in detail to the several figures of the drawings:

The bearing members of the structure or grating comprise conventional rolled channels having, as ordinarily, web members 10 provided with upper and lower legs 11 and 12 respectively which extend laterally from the web and are integral therewith. The upper legs 11 are slotted as at 13 and these slots are preferably equidistantly spaced from each other. Said slots extend inwardly of said upper legs 11 and terminate, preferably, at or adjacent the webs 10. The slotting of the upper legs in the manner explained produces confined welding areas of metal 14 of relatively small dimensions and each having a length approximating the width of the slots 13 and a width approximating the thickness of the web 10.

For the crossing or transverse members of the structure I employ, by preference, rectangularly-shaped twisted bars as illustrated at 15, the twisting of which not only provides sharp edges which resist skidding and slipping but which also provide relatively small and sharply defined welding projections which initially localize the heating electric current and facilitate considerably the electric resistance welding operation about to be referred to and which is practiced to produce the welded joints between the bearing members and the crossing or transverse members. The diameter of the crossing members or twisted bars 15, by preference, exceeds slightly the width of the slots 13 as more clearly shown in Figures 5 and 6.

Figure 6:
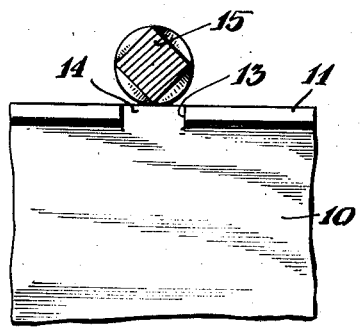
Figure 6 is a side elevation of the members shown in Figure 5 and prior to the welding operation.
Figure 7:
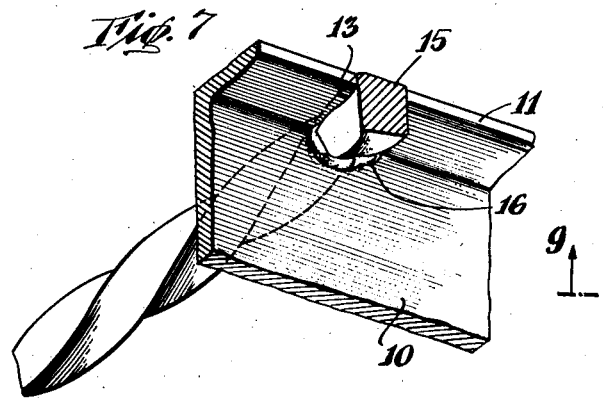
Figure 7 is a perspective view of the members after the welding operation showing the welded joint which has been produced.
Figure 8:
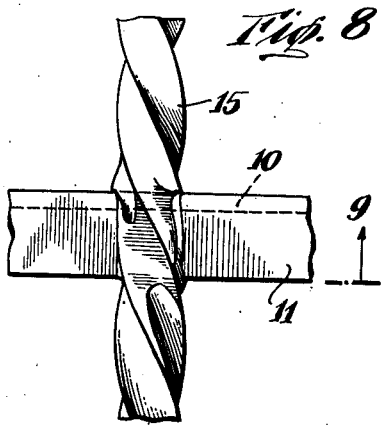
Figure 8 is a plan view of the members after the welding operation.
Figure 10:
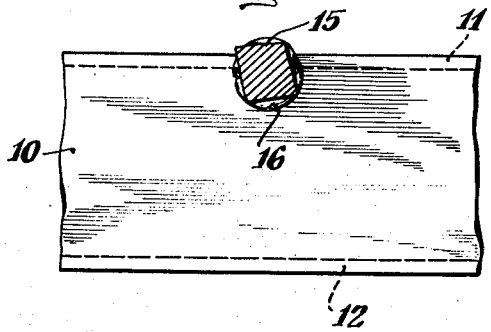
Figure 9:
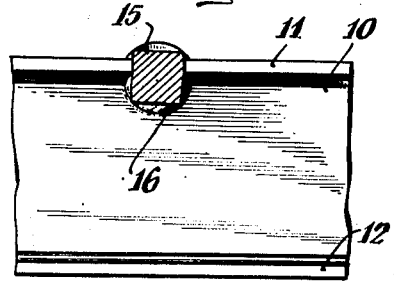
Figure 9 is a side elevation of the welded joint after the welding operation and on the line 9—9 of Figure 8 and, Figure 10 is a view similar to Figure 9 but looking from the other side of the welded joint.

To produce the welded joints between the crossing members or twisted bars and the channel members as shown in Figures 7 to 9, inclusive, the twisted bar is first superimposed on and supported in any manner in engagement with the confined area of metal 14 and in alignment with the slot 13 as shown in Figures 5 and 6, this engagement being between one of the small and sharp edges of the twisted bar and said confined welding area of metal whereby the electric heating current is localized and the welding operation is facilitated. Obviously, as the circumferential surface of the twisted bar is substantially uniform throughout its length, an exact placement of any specific circumferential portion of the twisted bar with the confined welding area is unnecessary which makes for speed in the welding operation and in the manufacture of the finished structure. Heating electric current is then passed through the twisted bar and the web and upper leg of the channel by means of suitable electric welding dies or electrodes as well-known in the art and mechanical pressure is applied simultaneously. The heating current thereupon acts to fuse the metal of the contacting members and as the operation proceeds the twisted bar is forced and crowded by pressure within the slot 13. The sharply defined edges of the twisted bar contact with the walls of the slot to further localize the heating electric current and to considerably facilitate the welding together of the opposed members. The welding operation proceeds by the passage of heating current between the members and the application of pressure and until the twisted bar is welded to the walls of the slot 13 as well as to the web of the channel and as shown in Figures 7 to 9, inclusive. When the weld is completed, the upper exposed edge of the twisted bar at the intersection of the members lies in a plane slightly higher than the plane of the upper surface of the leg 11 to thereby enhance and emphasize the anti-skid or anti-slip effect in the completed structure.

By localizing the heating electric current at two well defined and comparatively small areas of metal in the opposed contacting members at the beginning of the welding operation and by further localizing the current between the sharp edges of the twisted bar and the side walls of the slot 13, when the twisted bar has been forced and crowded within said slot, a relatively small amount of heating electric current is necessary to complete the welding operation. Furthermore, by providing the slot 13, much less current is necessary to weld the twisted bar to the channel than would be necessary to weld it across the entire width of the upper leg 11, as is obvious. Also, it is doubtful whether a satisfactory and perfect weld and a strong joint could be produced between the members were it not for the provision of the slot 13 and the welding together of the members in the manner explained. A further and desirable reason for employing the slot 13 is that it permits of the removal of a relatively large amount of metal from the completed joint which, if it were not first removed, would of necessity have to become a part of the welded joint in the form of extruded metal. This would produce a crude and unsightly form of joint to say nothing of the employment of additional and expensive electric current made necessary to produce it for the reason above explained. It would also add unnecessary weight to the finished structure. In the present case, a relatively small amount of extruded metal is present in the welded joint which is indicated at 16 in the drawings.

To produce a grating, bridge decking or analogous structure according to the present invention, the bearing members comprising the rolled channels are set on end and are spaced apart, preferably equidistantly, as shown in Figure 1. The crossing or transverse members comprising the twisted bars previously referred to are then welded to the channels in the manner hereinbefore described. To perform the welding operation any suitable dies or electrodes may be employed, which forms no part of the present invention, but the upper dies or electrodes should be of a size and configuration permitting them to overlap the twisted bar and slot 13 as well as to overlap the width of the upper leg 11 of the channel member so as to insure a complete and perfect welding of the twisted bar not only within the slot 13 and to its walls but to and within the web of the channel. Several welds may be effected simultaneously depending on the type of electric welding machine employed. Also the dies or electrodes may be of any configuration, furthermore and as will be obvious, and additional supports or other parts may be employed not only to confine and direct the direction of flow of the electric current between the members but to confine and direct the flow of the extruded metal in such manner as to hide it from view as nearly as possible in the finished structure. Any supporting means for supporting the grating of Figure 1, such as girders, angle bars or cross stringers, or all of them, or additional supporting means may be employed for the commercial product and form no part of the present invention.

It will be found in practice that a homogeneous and integral grating or analogous structure of very increased strength and rigidity may be produced according to the invention as described and chiefly because of the use of the channels as the bearing members and the manner in which the transverse members are integrally united therewith. The rigidity and strength of the structure, furthermore, are maintained because it is unnecessary to slot or otherwise mutilate the webs of the channels in the manufacture of the structure.

The invention claimed is:

1. A metallic structure including a plurality of channels spaced from each other and comprising web members and upper and lower legs connected therewith, said upper legs being provided with slots therein, and transverse members lying within said slots and welded to the walls of said slots and to said webs.

2. A metallic structure including a plurality of rolled channels spaced from each other and comprising web members and upper and lower legs integral therewith, said upper legs being provided with transverse slots therein terminating adjacent said web members, and crossing members having diameters exceeding the width of said slots and electrically welded to the walls of said slots and producing a homogeneous and integral structure.

3. A metallic structure including a plurality of rolled channels spaced from each other and comprising web members and upper and lower legs integral therewith, said upper legs being provided with transverse open slots extending therethrough and to points adjacent said webs, and crossing members having diameters exceeding the width of said slots and forced therein and electrically welded to the walls of said slots and to and within said webs.

4. A metallic structure including bearing members consisting of spaced channels comprising web members and upper and lower legs integral therewith, said upper legs being provided with slots forming relatively small welding areas in vertical alignment with said webs and crossing members integral with said channels and electrically welded to the walls of said slots and to and within said welding areas and channels.

5. A metallic structure including bearing members consisting of spaced channels comprising web members and upper and lower legs integral therewith, said upper legs being provided with transverse slots therein terminating adjacent said webs and crossing members having diameters exceeding the width of said slots and welded to the walls of said slots and within said webs to connect said channels and produce a homogeneous integral structure.

6. A metallic structure including bearing members consisting of spaced channels comprising web members and upper and lower legs integral therewith, said upper legs being provided with transverse slots terminating adjacent said webs and crossing twisted bars connecting said channels and welded to the walls of said slots and within said webs.

7. A metallic structure including bearing members spaced from each other and each comprising a web and a leg integral therewith and extending laterally therefrom, said legs each being provided with an opening extending therethrough and terminating adjacent the webs and crossing members initially having diameters exceeding the width of said openings and welded to the walls of said openings and to and within said webs to connect said bearing members together and produce a homogeneous integral structure.

8. A metallic structure including bearing members spaced from each other and each comprising a web and a leg integral therewith and extending laterally therefrom, said legs each being provided with a slot therein and crossing twisted bars welded to the walls of said slots and within said webs to connect said bearing members together.

9. A metallic structure comprising a web and a leg integral therewith and extending laterally therefrom, said leg being provided with a slot therein terminating adjacent the web and a crossing member initially having a diameter exceeding the width of the slot and welded to the walls of the slot and to and within the web by pressure electric resistance welding.

WINNIE S. LACHMAN.